United States Patent
Russert et al.

(10) Patent No.: US 8,724,948 B2
(45) Date of Patent: May 13, 2014

(54) METHOD FOR TERMINATING LIGHT-GUIDE FIBER BUNDLES

(75) Inventors: Hubertus Russert, Heidenrod (DE); Werner Sklarek, Heidesheim (DE)

(73) Assignee: Schott AG, Mainz (DE)

( * ) Notice: Subject to any disclaimer, the term of this patent is extended or adjusted under 35 U.S.C. 154(b) by 137 days.

(21) Appl. No.: 13/060,807

(22) PCT Filed: Aug. 28, 2009

(86) PCT No.: PCT/EP2009/006241
§ 371 (c)(1), (2), (4) Date: Mar. 30, 2011

(87) PCT Pub. No.: WO2010/022957
PCT Pub. Date: Mar. 4, 2010

(65) Prior Publication Data
US 2011/0182552 A1    Jul. 28, 2011

(30) Foreign Application Priority Data
Aug. 29, 2008  (DE) .......................... 10 2008 044 938

(51) Int. Cl.
*G02B 6/06* (2006.01)
*G02B 6/32* (2006.01)
*G02B 6/04* (2006.01)

(52) U.S. Cl.
CPC ........................................ *G02B 6/04* (2013.01)
USPC ................. 385/119; 385/31; 385/33; 385/34; 385/38; 385/39; 385/115; 385/116; 385/120

(58) Field of Classification Search
CPC ........................................................ G02B 6/04
USPC .............................................. 385/34, 119, 120
See application file for complete search history.

(56) References Cited

U.S. PATENT DOCUMENTS

| | | | | |
|---|---|---|---|---|
| 4,124,271 A | * | 11/1978 | Green | 385/21 |
| 4,805,598 A | * | 2/1989 | Ueda | 600/169 |
| 4,913,508 A | | 4/1990 | Blyler et al. | |
| 5,117,472 A | | 5/1992 | Blyler et al. | |
| 5,187,596 A | * | 2/1993 | Hwang | 358/484 |
| 5,300,162 A | * | 4/1994 | Brockmeyer et al. | 156/73.2 |

FOREIGN PATENT DOCUMENTS

| | | | | |
|---|---|---|---|---|
| GB | 1 406 277 | * | 12/1972 | G02B 5/16 |
| GB | 1 406 277 | | 9/1975 | |
| JP | 54 002141 | | 1/1979 | |
| JP | 61-165710 | | 7/1986 | |
| JP | 09 015448 | | 1/1997 | |
| JP | 2002 040271 | | 2/2002 | |
| WO | 93/08494 | | 4/1993 | |

OTHER PUBLICATIONS

Office Action issued by the European Patent Office for Application No. 09 778 172.8 dated Apr. 29, 2013.
Office Action issued by the State Intellectual Property Office of the People's Republic of China for Application No. 200980133955.1 dated Jan. 24, 2013.

* cited by examiner

*Primary Examiner* — Ryan Lepisto
(74) *Attorney, Agent, or Firm* — Pearl Cohen Zedek Latzer Baratz LLP (57) ABSTRACT

The invention relates to a method for terminating optical fiber bundles, wherein the fiber bundle is inserted into a sleeve which is filled with adhesive.

22 Claims, 5 Drawing Sheets

Fig. 7

METHOD FOR TERMINATING LIGHT-GUIDE FIBER BUNDLES

This application is a U.S. national stage of PCT/EP2009/006241 filed on Aug. 28, 2009 which claims priority to and the benefit of German Application No. 10 2008 044 938.5 filed on Aug. 29, 2008, the contents of which are incorporated herein by reference.

The invention concerns a method for terminating light guide fiber bundles and a sleeve with the end of a fiber bundle.

BACKGROUND OF THE INVENTION

Methods for terminating fiber bundles by means of a core end sleeve are already known. In practice, the bundle of optical fibers is usually inserted into a metal or plastic end sleeve and fixed by crimping or adhesive bonding. The end surface of the fiber bundle is usually ground and polished in order to achieve the lowest possible coupling loss. The minimum possible coupling loss for the coupling of light is realized by the densest possible arrangement of the fibers of 0.4 dB, plus the losses with the coupling in each optical fiber core by the surrounding fiber of 0.4 dB, plus a reflection loss at the interface, which is about 0.2 dB.

The optical fibers can be produced both from plastic and glass. The fibers generally consist of an optical core surrounded by sheathing made of a material with a low index of refraction, which makes it possible to achieve total reflection between the core and the sheathing.

To reduce the coupling loss still further, it is likewise known that the fiber bundles can be heated, so that the cross section of the fibers assumes a hexagonal shape, so that instead of circle packing, hexagonal dense packing is obtained. This further increases the proportion of the optical core in the light exit surface.

A disadvantage of the previously known methods is that they are very expensive and therefore are of limited suitability for applications with high cost pressure, for example, the automobile sector.

In addition, the termination of fiber bundles in places that are poorly accessible, for example, in repair work in a vehicle itself, is scarcely possible.

OBJECT OF THE INVENTION

The object of the invention is to make available a method for terminating a bundle of optical fibers that is as simple, inexpensive, and reliable as possible.

In particular, it should be possible to dispense with the polishing of the end surfaces.

Furthermore, the method should make it possible to terminate fiber bundles even in poorly accessible places.

Finally, a further object of the invention is to make available a simple method for terminating fiber bundles that minimizes coupling loss.

SUMMARY OF THE INVENTION

The object of the invention is already achieved by a method for terminating light guide fiber bundles and by a sleeve with the end of a fiber bundle according to one of the independent claims.

Preferred embodiments and refinements of the invention are described in the respective dependent claims.

The invention concerns, for one thing, a method for terminating light guide fiber bundles, in which a fiber bundle is produced and inserted into a sleeve. In this regard, at least the inside wall of the sleeve consists of a transparent material that has an index of refraction $n_2$.

Before, during or after the insertion of the fiber bundle, a transparent filler, especially a transparent adhesive, with an index of refraction $n_1$ is introduced into the sleeve. In the text which follows, the transparent filler will often be referred to simply as "adhesive", which will be understood to mean both an adhesive and a filler in the broadest sense.

The index of refraction $n_1$ of the filler, i.e., especially an adhesive, is greater than the index of refraction $n_2$ of the sleeve. The adhesive together with the sleeve thus forms a light guide that consists of an optical core of adhesive or filler and the sheathing in the form of a sleeve, with the fibers being embedded in the filler.

A glass fiber bundle with typically several hundred individual fibers is preferably used as the fiber bundle. The individual optical fibers consist of a core covered with sheathing with a lower index of refraction. In addition, the individual fibers are arranged in a jacket. The jacket is removed at the tip of the fiber bundle for termination.

The method of the invention allows terminations to be prepared for optical signal lines. However, it is also possible to use the method for terminating fibers provided for illumination purposes, especially laterally emitting fibers.

The filler with which the sleeve is filled before the fiber bundle is inserted is preferably dimensioned in such a way that the filler does not emerge at the upper edge of the sleeve. The filler is thus dimensioned in such a way that it is displaced when the fiber bundle is inserted and thus moves toward the rear. After the filler has been introduced, the sleeve is thus mostly filled with filler, but filler does not emerge and thus does not need to be subsequently removed. It goes without saying, therefore, that the filler is preferably introduced with a suitable metering device that allows exact metering of very small amounts.

In this regard, the fibers are preferably spaced some distance from the front end of the sleeve, and the light exit surface is preferably formed by the adhesive itself.

In accordance with the invention, the filler or adhesive is cured. The filler thus serves to fix the fiber bundle in place in the sleeve. Consequently, this is not an otherwise well-known optical gel that serves only to provide a volume of material with a higher index of refraction If the light exit surface is formed by the adhesive itself, a very simple method can be used to provide a termination, whose loss is not significantly worse than with previously known termination methods in which the ends are cut off and ground.

In accordance with the invention, a thermal treatment of the fiber bundle for adhesive bonding of the individual fibers is dispensed with. The fiber bundles can be terminated at room temperature without heat-sealing the fiber bundle by means of a laser or a flame. Consequently, the fibers retain their circular cross section, as is preferred.

The materials used as fillers are highly transparent optical materials, preferably silicones, polyurethanes, epoxides or acrylates, especially methacrylates.

A preferably optical adhesive, especially an epoxy adhesive, is used as adhesive.

For example, adhesives can be used which cure thermally or by irradiation with UV light. It is understood that in accordance with the invention, the values for the index of refraction refer to the adhesive in the cured state.

In a refinement of the invention, the end of a sleeve that faces away from the fiber bundle is placed on a sealing element, at least during the insertion of the fiber bundle, and the sealing element is removed after the fiber bundle has been inserted, especially after the adhesive has cured.

In this embodiment of the invention, the sealing element serves to form a light exit surface. The sealing element preferably consists of a material, especially a silicone or PTFE, which does not undergo integral material bonding with the adhesive.

The sealing element preferably has a smooth sealing surface, especially with an arithmetic mean roughness value $R_a$ of less than 0.8 µm, preferably less than 0.5 µm, and more preferably less than 0.1 µm. After the adhesive has cured, the sleeve is removed from the sealing element, and in the simplest case, a flat surface is provided as a light exit surface.

Preferably, a sealing element is used that does not undergo integral material bonding with the filler, even when a parting agent is not used, and that can be easily removed. However, depending on the filler that is used, it may also be necessary to use a parting agent.

In a refinement of the invention, the sealing element is textured; in particular, at least one elevation or depression can be provided for the purpose of forming a lens. The sealing element can thus also be used as a shaping element (die) to produce a desired shape of the light exit surface, for example, a lens, in order to bundle the emerging light.

In an alternative embodiment of the invention, instead of the sealing element, the light exit surface, which has a higher index of refraction than the sleeve, is already applied to the sleeve before the introduction of the adhesive, or the sleeve itself comprises the light exit surface.

Although this embodiment of the invention usually results in somewhat higher loss, it allows even simpler termination of a fiber bundle.

Preferably, a sleeve is used which has a transparent base that is formed as one piece with the walls of the sleeve. A pot-shaped sleeve of this description is filled with a filler, the fiber bundle is inserted, and then the filler is cured.

In a preferred embodiment of the invention, to reduce the proportion of total reflections, the base has a thickness of less than 1.5 mm, preferably less than 0.5 mm, and more preferably less than 0.3 mm. The fiber bundle is preferably inserted in such a way that the lowermost fibers are separated from the base of the sleeve by a maximum of 1 mm and preferably by a maximum of 0.5 mm. It has been found that adequate optical properties can be achieved in this way, even with a pot-shaped sleeve in which the base forms the light exit surface.

In a refinement of the invention, the sleeve comprises a cone in which the fiber bundle is inserted. A cone is understood to mean any segment of the sleeve in which the lateral faces are inclined and thus the cross section of the sleeve diminishes. Preferably, the cone is basically shaped like a conical frustum. The cross section of the sleeve and/or the cone is preferably essentially circular, but other forms are possible, especially oval or rectangular forms.

In addition, in a preferred embodiment of the invention, the cone has a small angle of inclination of less than 50°, and preferably less than 35°.

During the insertion of the fiber bundle, the cone serves to squeeze the individual fibers together. In particular, the cone makes it possible to realize an essentially hexagonal dense circle packing, in which the individual fibers with circular cross section are arranged with hexagonal dense packing, at least in some sectors.

The fiber bundle is preferably inserted into the sleeve with limited force and/or to a limited distance in such a way that the fibers, after they have been inserted, are separated some distance from the light exit surface.

At least the lateral faces of the cone, preferably the inside surfaces of the sleeve, are smooth to the extent that they have an arithmetic mean roughness value $R_a$ of less than 0.5 µm and especially preferably less than 0.3 µm. It has been found that smooth inside surfaces of the cone are important to prevent individual fibers from breaking off.

The invention allows the termination of light guide fiber bundles made of glass or plastic, especially in the case of fibers with a diameter of less than 1,000 µm, and preferably less than 100 µm.

Bundles of individual fibers of this type are suitable especially for the automobile sector, since they tolerate tight bend radii of less than 20 mm, preferably less than 5 mm, and are also suitable for long-term temperature loads of up to 150°, especially when they are made of glass.

In a refinement of the invention, the fiber bundle has a jacket that is joined with the sheath.

In particular, the jacket is removed in a lower region of the fiber bundle, and in the upper part of the sleeve, the jacket is still present and is heat-sealed or adhesively bonded with the sleeve there. For example, the jacket can be joined with the sleeve by ultrasonic welding. Alternatively, it is possible to weld the jacket with the sleeve by means of a laser. In this regard, a laser can be used which has a wavelength that is absorbed to a lesser extent by the sleeve than by the jacket. In this way, the jacket can be heated with the laser through the sleeve and thus welded with the sleeve.

In addition, the invention concerns a sleeve with the end of a fiber bundle, where the sleeve has an index of refraction $n_2$ in at least some sections and is filled with an adhesive in which the fiber bundle is embedded. The adhesive has an index of refraction $n_1$ that is higher than the index of refraction $n_2$ of the sleeve.

In this way, the sleeve and the adhesive form a light guide.

The fiber bundle is preferably spaced some distance from the end of the sleeve, where the sleeve in one embodiment of the invention is essentially filled with adhesive up to its front end, and the adhesive forms the light exit surface.

In an alternative embodiment of the invention, a light exit surface, for example, one made of a plastic with a different index of refraction, is incorporated in the sleeve.

In a preferred embodiment of the invention, the numeric aperture NA of the adhesive-filled sleeve is a maximum of 0.1, preferably a maximum of 0.05, and more preferably a maximum of 0.02 less than the numeric aperture of the fiber bundle, which comprises light guide fibers provided with sheathing.

The numeric aperture is computed as follows: $NA = \sqrt{n^2_{core} - n^2_{sheathing}}$.

In the computation of the numeric aperture of the sleeve, $n_{core}$ thus corresponds to $n_1$ and $n_{sheathing}$ corresponds to $n_2$. In the fiber bundle, $n_{core}$ corresponds to the index of refraction of the core of the fiber, and $n_{sheathing}$ corresponds to the index of refraction of the sheathing.

In an especially preferred embodiment of the invention, it is also possible to provide an adhesive-filled sleeve whose numeric aperture NA is higher than the numeric aperture of the fiber or the fiber bundle.

In this way, it is possible to provide a termination with only slight loss.

In another preferred embodiment of the invention, the index of refraction $n_1$ of the adhesive differs from the index of refraction of the core of the fibers of the fiber bundle by a maximum of 0.15, preferably a maximum of 0.08, and more preferably a maximum of 0.02.

This condition also makes it possible to provide a design with low optical loss.

Especially to have an index of refraction that is as similar as possible to the index of refraction of the optical fibers, the sleeve preferably has an index of refraction of 1.4 to 1.52.

The adhesive preferably has an index of refraction of 1.45 to 1.6.

To compact the fibers of the fiber bundle, the sleeve preferably has a cone.

In a refinement of the invention, a cylindrical region borders the cone, at least on the end of the cone that faces away from the fiber bundle. The cylindrical region has especially the form of a circular cylinder.

In the cylindrical region, the fibers have a well-defined packing density. For example, it is especially provided that the diameter of the cylindrical region conforms essentially to the cross-sectional area of the light guide fibers in the form of hexagonal dense circle packing.

In this way, for one thing, the desired packing density is ensured as soon as the fiber bundle has been inserted, for example, a limited distance into the cylindrical region.

For another, the fibers in the cylindrical region are aligned parallel to one another.

Especially good parallel alignment is also achieved especially if an essentially cylindrically formed region also borders on the end of the cone that faces away from the end of the fiber bundle.

The invention also concerns a system that comprises, besides the sleeve with the fiber bundle, a plug with a light entrance surface, such that a light exit surface is defined by the adhesive of the sleeve, and the light emerges from the light exit surface of the sleeve and enters the light entrance surface of the plug.

In the case of a predetermined light direction, the light exit surface is preferably smaller than the light entrance surface at the coupling points of the system. In particular, a light exit surface is provided which has a diameter that is at least 0.05 mm smaller and preferably at least 0.07 mm smaller than the light entrance surface adjoining the coupling point.

In particular, the light entrance surface is provided with a diameter that is at least 0.05 mm greater and preferably at least 0.07 mm greater than the light exit surface adjoining the coupling point.

This type of arrangement makes it possible especially to compensate for tolerances of the plug and the sleeve. In particular, the coupling loss due to light losses arising from a plug that is not optimally aligned is reduced.

The invention makes it possible to produce a sleeve with the end of a fiber bundle, where the loss of this system in the given frequency range for which the system is used is less than 1.8 dB and preferably less than 1.3 dB.

In a refinement of the invention, the sleeve has an undercut in some sections. An undercut in this context is understood to mean an increasing cross section over a limited region of the sleeve. This undercut, which is filled with filler, results, after the filler has cured, in a positive-locking connection between the sleeve and the filler in addition to the integral material bonding. This allows better absorption of tensile forces. This embodiment of the invention is suitable especially with the use of sleeve materials that can be only poorly adhesively bonded (for example, PTFE).

In another refinement of the invention, the sleeve has means for attachment to another component. In particular, the means of attachment are designed as part of a plug connection. These means can be, for example, latches, a collar, etc. The invention thus makes it possible, already during the termination, to provide an optical plug in a very simple way.

The sleeve preferably consists of plastic, preferably a polymethyl methacrylate or a polycarbonate.

In addition, poly(methacrylate methyl imide) (PMMI) has been found to be especially suitable. This material is distinguished by its especially high heat resistance.

In addition, the invention concerns a sleeve for the termination of an optical fiber or an light guide fiber bundle, especially with one or more of the features described above. The sleeve is filled with an adhesive with an index of refraction $n_1$ that is greater than the index of refraction $n_2$ of the sleeve.

BRIEF DESCRIPTION OF THE DRAWINGS

The invention is described in greater detail below with reference to FIGS. 1 to 7.

DETAILED DESCRIPTION OF THE DRAWINGS

Figure 1:
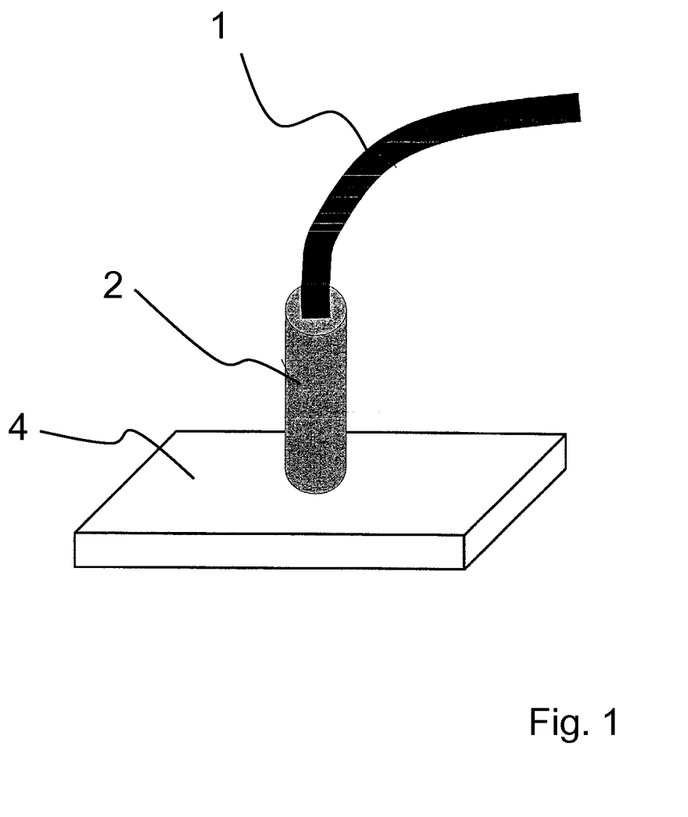
FIG. 1 shows a fiber bundle with a sleeve, which is placed on a sealing element.

Especially the principal steps of a method for terminating light guide fiber bundles are to be explained with reference to FIG. 1.

The drawing shows a fiber bundle 1, which comprises a plurality of individual fibers (not shown).

To terminate the fiber bundle, the fiber bundle can be freed, for example, in its front region, from a jacket (not shown). The individual fibers are then inserted into a sleeve filled with adhesive (not shown).

During this process, the sleeve 2 is positioned on a sealing surface 4, so that the adhesive does not escape at the bottom, and after curing, a smooth surface is present, which forms a light exit surface.

After the insertion of the fiber bundle, the adhesive can be cured, for example with UV light (not shown), and then the sleeve 2 can be removed from the sealing surface.

In this embodiment of the invention, the sleeve 2 consists of a transparent material that is UV-transparent.

The sealing element 4 does not undergo integral material bonding with the adhesive, so that the sleeve 2 can be removed with little or no force.

The sleeve 2 can be designed, for example, as a plug or part of a plug (not shown).

Figure 2:
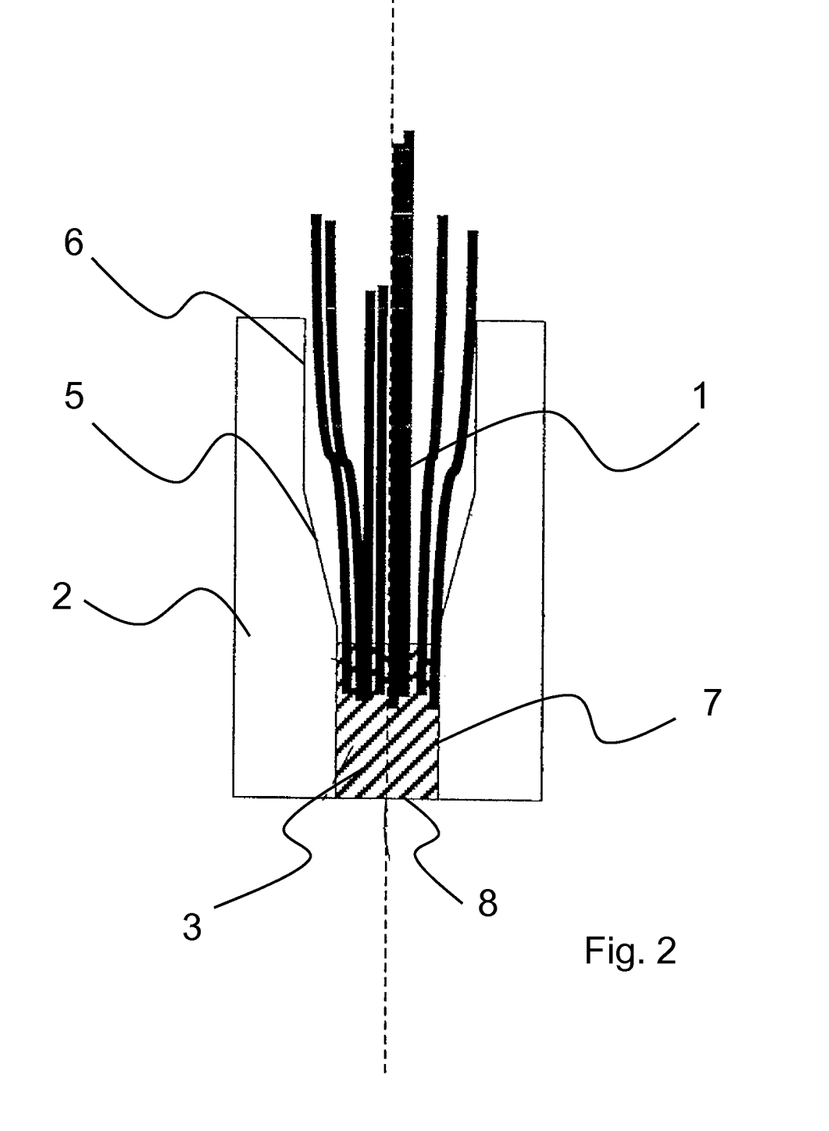
FIG. 2 is a schematic sectional view of a sleeve with a fiber bundle.

FIG. 2 is a schematic sectional view, in which the individual fibers of the fiber bundle 1 are shown schematically.

The sleeve 2 contains a cone 5, which serves the purpose of squeezing the individual fibers of the fiber bundle 1 together during the insertion of the fiber bundle 1 into the sleeve 2. An essentially cylindrically formed region 7 is provided below the cone 5. At least the cylindrical region 7 is filled with adhesive 3. The fibers are aligned essentially parallel to one another in the cylindrical region 7 and are densely packed due to the reduction of cross section by the cone 5. A light exit surface 8 is formed by the adhesive 3 itself. The adhesive 3 has a higher index of refraction than the sleeve 2, so that a light guide is formed by the combination of the sleeve 2 and adhesive 3.

All of the fibers of the fiber bundle 1 are spaced some distance from the light exit surface 8.

Since the adhesive 3 itself transmits the light, polishing of the ends of the fibers can be dispensed with. As is clearly seen in the drawing, the fibers can even assume different distances from the light exit surface 8 without this impairing the function of the termination.

Above the cone 5, there is another cylindrical region 6, into which the fibers are pushed and at first are aligned parallel to one another. This arrangement allows especially simple insertion and reduces the risk of fibers being broken off.

Figure 3:
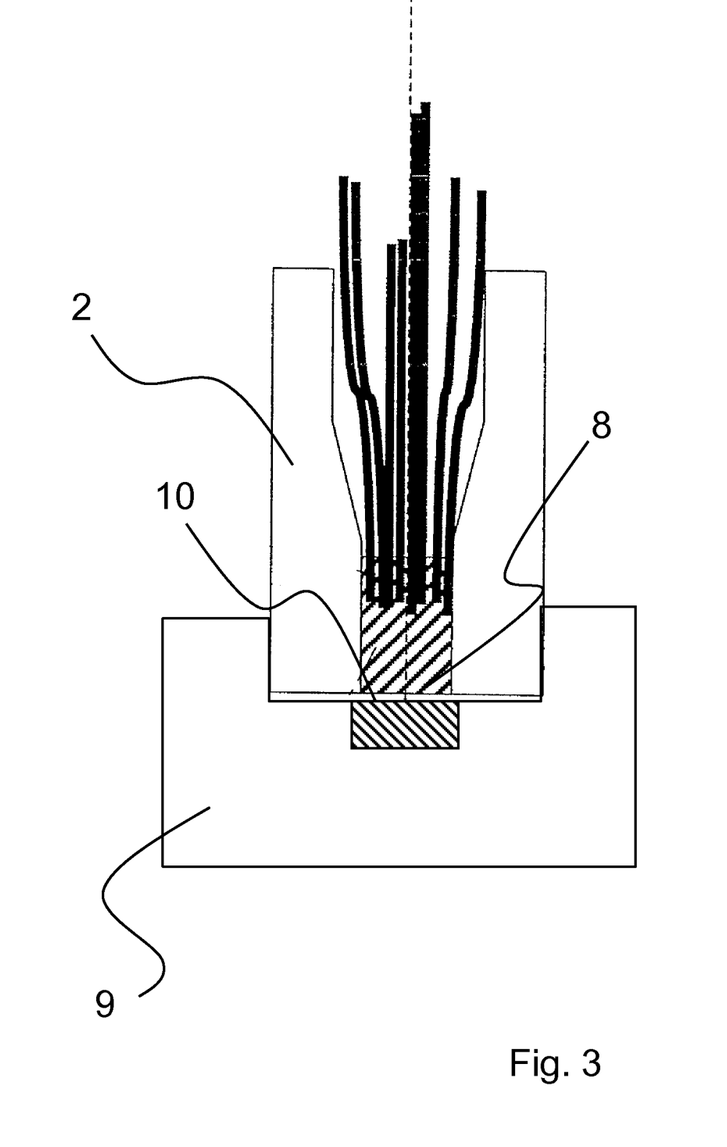
FIG. 3 is a schematic view of a sleeve used as a plug, which is inserted in another plug.

FIG. 3 shows the sleeve 2 that was already illustrated in FIG. 2. In the embodiment of FIG. 3, the sleeve 2 serves as a plug and is inserted into another plug 9.

The plug 9 can be, for example, part of an electronic component, in which there is a communications connection via a light guide formed by the fiber bundle.

The plug 9 has a light entrance surface 10, which has a somewhat larger diameter than the light exit surface formed by the adhesive.

In this way, losses due to manufacturing tolerances of the plug 9 and sleeve 2 can be further reduced.

Figure 4:
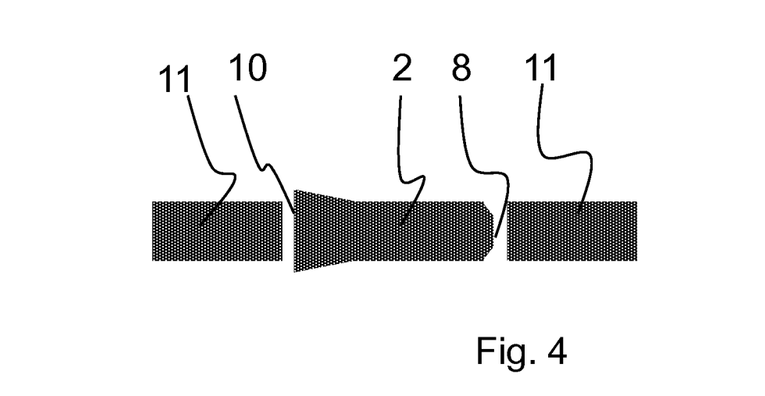
FIG. 4 is a schematic view of a sleeve used as an adapter.

FIG. 4 is a schematic view of a sleeve used as an adapter. The sleeve 2 has both a light entrance surface 10 and a light exit surface 8. Both the light entrance surface 10 and the light exit surface 8 are preferably produced by the method for terminating light guide fiber bundles that was described above.

Compared to the cross section of the light guide 11 that borders on the sleeve 2, the light exit surface 8 has a smaller diameter, and the light entrance surface 10 has a larger diameter. Coupling losses can be significantly reduced in this way.

The method of the invention makes it possible in an especially simple way to provide end surfaces with different diameters.

Figure 5:
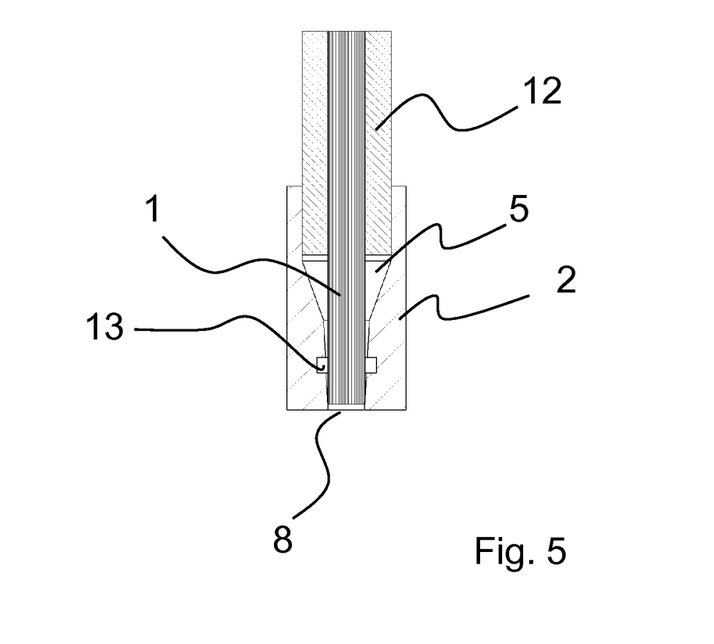
FIGS. 5 and 6 are additional schematic sectional views of embodiments of a sleeve with a fiber bundle.

FIG. 5 shows another embodiment of a sleeve 2 with a fiber bundle 1.

The fiber bundle 1 has a jacket 12, which is stripped at the tip of the fiber bundle. In the rear region, the jacket 12 is pushed into the sleeve and is securely joined with the sleeve for further strain relief. For this purpose, the jacket 12 can be, for example, heat-sealed with the sleeve 2, especially by means of laser light, whose wavelength is chosen in such a way that the jacket 12 absorbs it to a greater extent than the sleeve 2. In addition, the jacket 12 can be pressed in the cone 5.

In addition, in this embodiment, the sleeve 2 has an undercut 13, which involves an increased cross section over a limited region of the sleeve. After the curing of the filler, with which the undercut 13 is also filled, a positive-locking connection is formed between the filler and the sleeve 2. In this embodiment, the light exit surface 8 is formed by the filler.

Figure 6:
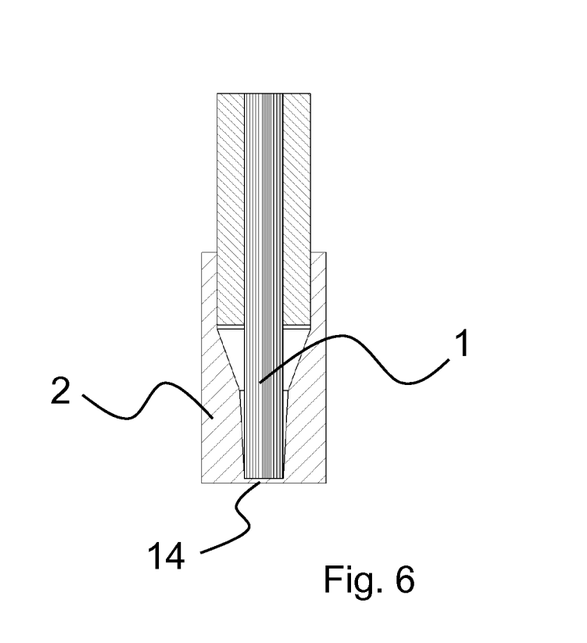

FIG. 6 shows an alternative embodiment of the invention, in which the sleeve 2 is shaped like a pot, and the light exit surface is formed by the base 14 of the sleeve 2. The base 15 of the sleeve 2 is preferably formed with the sleeve as a single piece. To produce a system with the least possible loss, the base 14 of the sleeve 2 is formed thin, and the fiber bundle 1 is pushed as close as possible to the base, especially until the first individual fibers come into contact with the base 14.

Compared to the previously described embodiment, this system generally shows somewhat higher loss, but it has the advantage that it allows even simpler termination of the fiber bundle.

Figure 7:
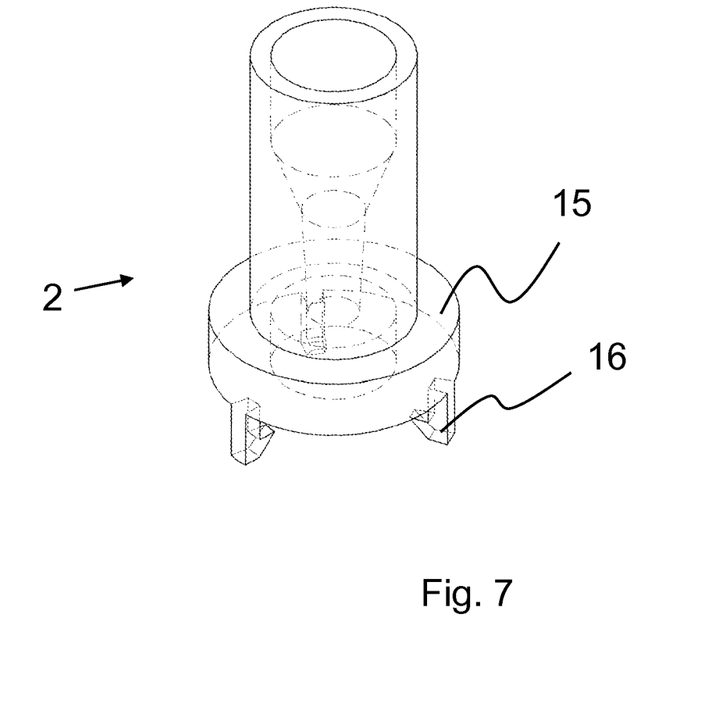
FIG. 7 is a schematic drawing of a sleeve with means of attachment.

Another embodiment of the invention will now be explained with reference to FIG. 7. Only the sleeve 2 is shown here. Compared to the sleeve illustrated in FIG. 6, the sleeve 2 additionally has a collar 15 with latching elements 16, which are realized as hooks in the embodiment illustrated here.

This allows simple mounting of additional components, such as LEDs, lasers, photodiodes, etc. With the termination, part of the plug connector is made available for toolless mounting at the same time.

Alternatively, clips, pins for pressing or mushroom anchors, or brackets for screwing and clamping are provided.

It goes without saying that the invention is not limited to a combination of the features described above, but rather that those skilled in the art will combine all features where it makes sense.

LIST OF REFERENCE NUMBERS 1 fiber bundle
2 sleeve
3 adhesive
4 sealing element
5 cone
6 cylindrical region
7 cylindrical region
8 light exit surface
9 plug
10 light entrance surface
11 light guide
12 jacket
13 undercut
14 base
15 collar
16 latching element

The invention claimed is:

1. A method for terminating light guide fiber bundles, comprising:
providing a fiber bundle of glass fibers, each of the glass fibers being provided with sheathing;
providing a sleeve, having an index of refraction $n_2$ in at least some sections thereof;
introducing a transparent filler having an index of refraction $n_1$ into the sleeve, where $n_1$ is greater than $n_2$, to provide a surface for the exit of light from the sleeve;
inserting the fiber bundle into the sleeve, with the ends of the fibers unpolished, such that the sheathed glass fibers are embedded in the filler and ends of glass fibers of said fiber bundle assume different distances from the light exit surface; and
curing the filler.

2. The method of claim 1, wherein the sleeve comprises a transparent base.

3. The method of claim 2, wherein the base is formed as one piece with the walls of the sleeve.

4. The method of claim 2, wherein the base has a thickness of less than about 1.5 mm.

5. The method of claim 1, wherein the transparent filler is cured by light or thermally.

6. The method of claim 1, wherein the fiber bundle is inserted into the sleeve with limited force or to a limited distance.

7. The method of claim 1, wherein individual glass fibers of the fiber bundle have a diameter of less than about 100 μm.

8. The method of claim 1, wherein the end of the fiber bundle is compressed to form hexagonal dense circle packing.

9. The method of claim 1, wherein the fiber bundle has a jacket that is joined with the sleeve.

10. The method of claim 9, wherein the jacket is heat-sealed with the sleeve.

11. The method of claim 1, wherein the sleeve comprises a base forming a light exit surface and the material of the base is the same as the material of the sleeve.

12. A terminated light guide fiber bundle, comprising:
a bundle of glass fibers each provided with sheathing, the fibers having unpolished ends; and
a sleeve having an index of refraction $n_2$ in at least some sections and which is filled in at least some sections with a filler,
wherein:
the sheathed glass fibers are embedded in the filler,
the filler provides a surface for the exit of light,
the filler has an index of refraction $n_1$ that is higher than the index of refraction $n_2$ of the sleeve,
the filler is cured,
the fiber bundle is adhesively bonded in the sleeve by the cured filler, and
ends of glass fibers of said fiber bundle assume different distances from the light exit surface.

13. The terminated light guide fiber bundle of claim 12, wherein the numeric aperture NA of the sleeve filled with filler is a maximum of 0.1 less than the numeric aperture of the fiber bundle.

14. The terminated light guide fiber bundle of claim 13, wherein the index of refraction $n_1$ of the filler differs from the index of refraction of the core of the fibers of the fiber bundle by a maximum of 0.15.

15. The terminated light guide fiber bundle of claim 12, wherein the sleeve has an index of refraction of about 1.4 to about 1.52.

16. The terminated light guide fiber bundle of claim 12, wherein the filler has an index of refraction of about 1.45 to about 1.6.

17. The terminated light guide fiber bundle of claim 12, wherein the sleeve comprises plastic.

18. The terminated light guide fiber bundle of claim 12, wherein the loss of the system is less than about 1.8 dB.

19. The terminated light guide fiber bundle of claim 12, wherein the fibers of the fiber bundle have a circular cross section.

20. The terminated light guide fiber bundle of claim 12, wherein the sleeve is attached to another component.

21. The terminated light guide fiber bundle of claim 12 wherein the filler comprises an adhesive and wherein the index of refraction $n_1$ of the filler differs from the index of refraction of at least the core of the optical fiber by a maximum of about 0.15.

22. The terminated light guide fiber bundle of claim 12, wherein the sleeve comprises a base forming a light exit surface and the material of the base is the same as the material of the sleeve.

* * * * *